United States Patent [19]

Denman

[11] 4,184,000
[45] Jan. 15, 1980

[54] COUPLING DEVICE FOR GLASS OR METAL PARTS

[76] Inventor: Stephen A. Denman, 1216 Cloverfield Ave., Apt. A, Dayton, Ohio 45429

[21] Appl. No.: 889,373

[22] Filed: Mar. 23, 1978

Related U.S. Application Data

[63] Continuation of Ser. No. 704,327, Jul. 12, 1976, abandoned, and a continuation of Ser. No. 105,554, Jan. 11, 1973, abandoned, which is a continuation of Ser. No. 825,122, May 6, 1969, abandoned, and Ser. No. 536,242, Jan. 18, 1966, abandoned.

[51] Int. Cl.² .......................... C09J 7/02; B60J 1/02; B60J 1/20; H01Q 1/32
[52] U.S. Cl. .................................. 428/347; 52/582; 428/83; 428/357; 428/461; 428/465; 428/500; 428/542; 156/272; 156/273; 156/293; 156/306; 156/308; 156/309; 156/311; 156/107; 296/93; 343/715
[58] Field of Search ............... 156/272, 273, 293, 306, 156/308, 309, 311, 107, 108, 275; 428/542, 347, 461, 465, 500, 83, 357

[56] References Cited

U.S. PATENT DOCUMENTS

| | | | |
|---|---|---|---|
| 3,049,465 | 8/1962 | Wilkins | 156/272 |
| 3,263,268 | 8/1966 | Flaherty | 156/275 X |
| 3,462,903 | 8/1969 | Kronbetter | 52/400 |

*Primary Examiner*—P. C. Ives
*Attorney, Agent, or Firm*—Jerome P. Bloom

[57] ABSTRACT

A coupling element comprising elongate thermo-plastic strip material structured to provide that, on application thereto of heat in the range from about 300° to about 500° F. the outer portion thereof becomes fluidly adhesive, and is particularly adapted thereby to quickly form a ready bond and a clean seal between different materials, especially between glass and metal parts. While under the application of heat in the range specified, the outer portion of the element becomes fluidly adhesive, the inner or core portion of the element retains, as originally provided, an essentially stable form which accommodates and conforms to the contour of an applied load.

On self cooling in place the strip coupling device provides a uniquely complete and extremely strong bond and seal between parts of unlike materials. In preferred embodiments and applications the invention provides for an improved installation of a window, windshield or like unit.

Elements of the invention are particularly distinguished by their reversibility. Once an element is in place and serving as a bond, it need merely be subjected to heat in the prescribed temperature range of 300° to 500° F., under which conditions the outer portion of the element becomes fluid while the stability of the core thereof is maintained. This enables that the element may be quickly and easily removed from between the parts for which it formerly served as a bond.

18 Claims, 11 Drawing Figures

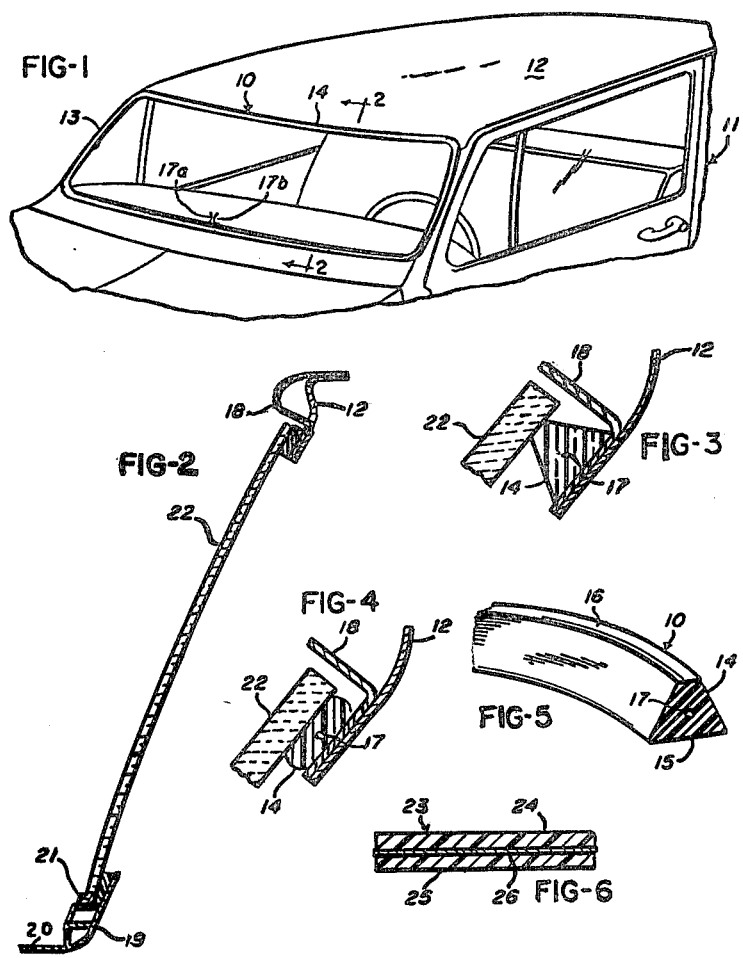

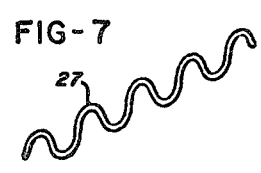
FIG-7
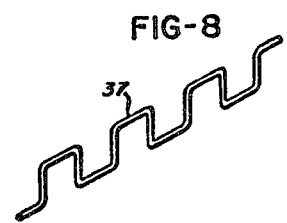
FIG-8
FIG-9
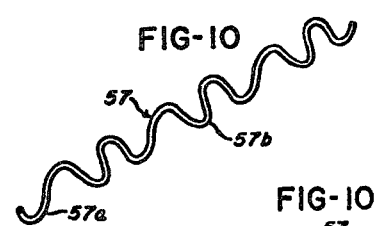
FIG-10
FIG-10A
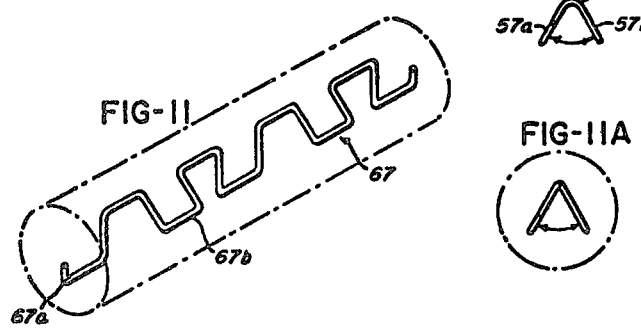
FIG-11
FIG-11A

COUPLING DEVICE FOR GLASS OR METAL PARTS

This application is a continuation of applicant's presently pending application Ser. No. 704,327, filed July 12, 1976, abandoned, for COUPLING DEVICE, a continuation of applicant's prior application Ser. No. 105,554, filed Jan. 11, 1973, abandoned, for the same said "COUPLING DEVICE" which, in turn, was a continuation of applicant's prior filed co-pending applications Ser. No. 825,122 and Ser. No. 536,242, respectively filed May 6, 1969 and Jan. 18, 1966, both abandoned, for said "COUPLING DEVICE".

BACKGROUND OF THE INVENTION

This invention relates to a unique coupling device which has proven to lend itself, in particular, to new and improved window and windshield installations. Its impact is particularly significant in the automotive industry. The invention will be therefore described in this respect, though its application is obviously not so limited and such is not intended.

The prior art has evidenced many, many problems in respect to installations involving the connection of glass or metal parts and particularly glass and metal parts. For example, with respect to the automotive industry, with past and existing practice and materials it has proven to be a difficult and arduous task to install a windshield or like structure in the provided metal frame. The difficulties have stemmed from several sources. In the first instance it has been found there must be extreme care in handling windshields, particularly in a production operation, to avoid damage. The problem in this respect has been compounded since the frames or openings for such items are usually less than precision formed. For such reasons, as well as others, the automotive companies have found there is considerable time consumed in set up and adjustment of windshields in the process of their installation. The problem is further compounded by the fact that heretofore known plastic sealing materials commonly employed for the purposes described are either so messy to handle that there is a large amount of time and money consumed in cleanup or the glass windshield must be applied in such a manner and under such pressure as to invite damage. As a matter of fact in this respect damage has proven to be quite frequent.

That in the prior art there has been no proper solution to the problems above posed is well evidenced by the fact that different automotive companies use different materials and systems for installing windshields.

For example, one Motor Company uses a cold adhesive tape to line an opening, following which a windshield is forced against the tape under the influence of a substantial hydraulic force. The object is to cold flow the tape and produce thereby a bond between the tape, the windshield and the framing structure. This has been the ultimate of the prior art as far as this Motor Company has been concerned. However, this practice has produced many cracked windshields in this Motor Company's production line. In any event, the pressures involved invariably produce residual strains in the glass structure and in many cases cracking occurs later. Moreover, technical information that has been uncovered indicates that with the prior art material and process utilized by this Motor Company the initial adhesion between the windshield and the automobile body is relatively low. This is inherent in their practice since the requirements of the adhesive tape employed dictates that the incorporated plasticizers and tackifiers be locked in to prevent sag or flow of the tape when subjected to elevated environmental temperatures, the objective being to prevent surface wetting. Where there is a maximum dimensional mismatch of body and windshield in application of the windshield, the rebound after compression is relieved causes a break in the bond line between the tape and its related structure at the point or points of minimum compression. Since initial adhesion is relatively low, in time the gap in the bond line grows, and leaks occur. Where sufficiently high pressure is used to overcome this fault, stress and cracks can readily result.

In contrast to the aforementioned procedure, another large automotive concern utilizes a relatively messy mastic material for bonding windshields rather than a cold flowed tape. This mastic resembles a soft caulking compound. In use, it is extruded and applied around the frame for a windshield in a bead form. Due to its ready flow condition it is necessary to interpose spacer blocks to contain successive sections of the mastic bead. Following the application of this bead, it must not be cured before the windshield is set in place. If the cure is too fast the mastic passes the point of usage and must be replaced. In some instances it takes much too long for the bead material to set and in such case the application and seal of the windshield is faulty. In any case, the mastic is messy on application of the windshield and it tends to flow in a manner to contaminate adjacent structural areas. This necessitates much cleaning and entails extra labor and expense in its use.

The prior art is loaded with all types of thermo-plastic and thermo-setting materials and has provided concepts of fusing, for example, thermo-plastic materials with a compatible thermo-plastic tape. Such a concept is evidenced in Wilkins U.S. Pat. No. 3,049,465. Wilkins refers to fusing like elements with a tape of similar physical characteristics. Of course, as will be self-evident, the problems are extremely different when the coupling problem has to deal with the connection of dissimilar metal and/or glass parts since here fusion is not possible in the sense of the Wilkins concept. Thus, Wilkins does not comprehend either the problems faced by the present invention or the solutions thereof as necessitated by the particular environment of the invention. As to the adhesive art, it has also been heretofore known to encase an ordinary wire in a thermo-setting resin such as revealed in U.S. Pat. No. 3,263,268 to Flaherty and to use such resin in this form to create a flow of fluid adhesive between parts. However, the disclosure of Flaherty has no more than that of Wilkins led to any improvement beneficial in the area of concern and has not achieved the benefits of the present invention. If it had, the automotive industry as well as the window industry would have jumped on the advantages afforded thereby long since. Flaherty refers to utilizing a cover portion of material such as a thermo-setting "B stage" epoxy, polyester, polyurethanes, polymerizable thermo-plastics and the like but it must be pointed out that neither the thermo-setting or thermo-plastic material of the nature noted has or can satisfactorily solve those problems to the solution of which the present invention is directed. It remains that a polymerizable thermo-plastic does in fact have the characteristics of a thermo-setting material in that it is irreversible. On application of heat, particularly in the range to be specified in accordance with the present invention, the polymerizable thermo-plastic becomes a fluid body and melts throughout. Where a wire is internally thereof the internal structure will melt first and the remainder will follow. Lacking the feature of reversibility the polymerizable material cannot be considered a true thermo-plastic. These facts are pertinent to the inability of the Flaherty material to be applied with any satisfactory result to the purposes of the present invention.

Attention is directed to the fact that nowhere in the prior art is there a disclosure of an elongate coupling strip wherein only the surface becomes fluidly adhesive upon application of a specific range of heat while the interior thereof remains essentially stable. In this aspect of the concept of an adhesive tape, well proven, already, in the automotive industry, lies a unique and unexpected result in the art of applying glass to metal and particularly in the formation of a windshield, window or like unit assembly.

DESCRIPTION OF THE INVENTION

With the aforementioned in mind, it must be understood therefore that the present invention relates to improvements in devices and methods for the joining together of parts, particularly glass and metal parts. It will be described herein in particular reference to its significant advantages in applying windshields and like objects to openings in automotive vehicles and various other comparable applications. As will be seen, preferred embodiments afford, in any case, a simple but effective means for quickly, cleanly, and efficiently attaching a glass object to a supporting structure. Moreover, they create windshield, window and like units of unexpected strength and provide an optimal seal of an opening.

It will become self-evident that the use of the invention embodiments requires no special training or skill. It avoids the requirement for application of high pressures, the special equipment entailed for such and the consequent potential damage that such will involve. Moreover, it eliminates the need for use of messy mastic materials which are difficult to handle and avoids substantial clean up problems and expense.

The preferred embodiment of the invention as here illustrated presents an elongate stable but flexible thermo-plastic strip embodying a wire core, in some instances of a particularly formed configuration. Through the medium of this wire, heat may be distributed quite uniformly throughout the thermo-plastic body. Moreover, the strip is such and so structured that with the distribution of heat, particularly in the range of about 300° to 500° F., its outer portion and only the outer portion of the strip becomes fluidly adhesive while the internal portion remains in an essentially stable form though modified to a condition to accommodate and plastically deform under compression. On rapid cooling, without exterior influence, the invention provides, in particular between glass and metal, as will be described, an unexpectedly clean, strong and leakproof, long lasting bond.

Basically the invention provides a coupling device having a special application to creating a bond between metal and glass in the form of an element physically comprised of flexible thermo-plastic material the internal or core portion of which has a stable form through a temperature range including 300° to 500° F. and the external portion of which exhibits a fluidly adhesive form about a stable core as the temperature of the element is elevated to a range of 300° to 500° F.

It is therefore a primary object of the invention to produce improved devices for the coupling or bonding of parts of unlike material, particularly glass to metal, which are economical to fabricate, more efficient and satisfactory in use, adaptable to a wide variety of applications and unlikely to malfunction.

Another object of the invention is to provide a generally new means and method for bonding parts of different materials enabling cleanliness, speed, and ease of application.

A further object of the invention is to provide means enabling a uniquely improved window, windshield or like unit.

Another object of the invention is to provide a coupling device of improved nature consisting of a thermo-plastic body in strip form having means therein for the uniform dissemination therethrough of heat, the strip being so structured that under particular temperature conditions it is characterized by having its outer and only its outer portion including its outer surface become fluidly adhesive while the remainder retains an essentially stable form modified only sufficiently to accommodate a required deformation under load.

Another object of the invention is to provide an improved coupling device, particularly advantageous for coupling glass to metal parts, which device has an elongate strip form and interiorly thereof a formed wire which when suitably energized to a predetermined temperature will produce a generally uniform heat throughout the device, which device is of a nature to provide that only its outer portion becomes fluidly adhesive under the influence of said predetermined temperature while the inner or core portion of the device retains an essentially stable load accommodating form.

A further object of the invention is to provide a bonding strip the use of which obviates the incidence of heat distortion of coupled parts.

An additional object of the invention is to provide an improved means for applying windshield or like window objects in frame structures of unlike material.

Another object of the invention is to provide devices for the coupling together or bonding of parts and the method of their use possessing the advantages structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

DESCRIPTION OF A PREFERRED EMBODIMENT OF THE INVENTION

Referring to the drawings, wherein preferred but not necessarily the only forms of embodiment of the invention are shown, FIG. 1 is a fragmentary view, in perspective, of an automobile, illustrating an invention coupling device as applied for the installation of a windshield;

FIG. 2 is a fragmentary view, partly diagrammatic, taken along the line 2—2 of FIG. 1, a windshield being shown bonded to the body of the automobile by the illustrated coupling device;

FIG. 3 is a fragmentary cross-sectional view, enlarged with respect to FIG. 2, showing a windshield in place upon the invention coupling device immediately prior to the resistance core of such device being energized;

FIG. 4 is a view like that of FIG. 3 taken after the resistance core has been energized;

FIG. 5 is an enlarged fragmentary view of a coupling device as illustrated in FIGS. 1 through 4;

FIG. 6 is a fragmentary cross-sectional view of another form an invention coupling device may take; and FIGS. 7 through 11 of the drawings show preferred forms of the core to be utilized in the embodiment of the invention illustrated in FIGS. 1 through 5.

Like parts are indicated by similar numerals of reference throughout the drawings.

Referring to the drawings, the embodiment of the invention illustrated in FIGS. 1 through 5 reveals a coupling device in strip form. This strip is mainly composed of a body 10 of flexible thermo-plastic the material of which is stable. The body 10 is particularly characterized by physical properties that provide that when it is subjected to a predetermined amount of heat it may be plastically deformed under compression as the surface thereof becomes fluidly adhesive while the core or inner portion thereof remains stable and capable of accommodating a load. This body is preferably formed of a thermo-plastic but may be of a thermo-setting compound if the same can be provided with physical characteristics and responses equivalent to that here described.

For example, the body 10 may comprise natural and synthetic rubber or rubber resin compounds, polymers such as polyamides, polyesters, polysulfides, polyurethanes and other similar temperature sensitive means. However, the optimal materials for use in the embodiment of the present invention have been found to be modified Butyl and Ethylene-Propylene synthetic rubbers which have a softening temperature range of 300° to 500° F. For this reason any substitute materials employed should have generally equivalent physical characteristics and have the properties to provide that when subjected to a range of temperature from about 300° to 500° F. the outer portion and only the outer portion of the strip body including its surface becomes fluidly adhesive while the balance remains in an essentially stable form though modified to a condition it will accommodate and plastically deform to adapt to the contour of an applied load.

As specified heretofore, the body 10 is such that with the specified application of heat, only its outer portion including its surface becomes fluidly adhesive while the balance remains in essentially stable form, modified to a condition to accommodate and plastically deform sufficient only to accommodate the applied load. Thus, there is basically required by the invention that in the prescribed temperature range of about 300° to 500° F., there is a differentiation in the physical characteristics of the outer surface portion of the body on the one hand and the interior or core portion of the body on the other. This invention disclosure involves this discovery and by various means it can be applied to any one of the large number of thermo-plastic materials or their equivalents as above defined. With the present invention concept before them, fabricating personnel versed in the art can then create the mix to meet the limitations herein prescribed.

To illustrate, but not limit, for example, the thermoplastic mix need only involve proper choices of percentages of conventionally employed fillers, tackifiers and plasticizers to combine with the basic thermo-plastic of the type specified to create the body 10 as a compound in a form that on application of about 300° to 500° F. heat there is produced in the body 10 a controlled migration of the tackifiers and plasticizers to the body surface to render it fluidly adhesive while leaving the underlying inner portion of the body 10 stable though deformable under compression. With respect to the underlying inner portion of the body 10, with the application of heat in the range specified a temporary loss of memory occurs which on cooling in place returns and enables the body to adjust to the load contour and to be adhesively sealed to the load medium by reason of the differentially structured fluidly adhesive outer surface or cover portion created in the heating.

In the alternative, in its forming the internal structure of the body 10 may be differentiated to provide that a surface layer of the material of which it is comprised may be formed with less inert filler than the interior or core of the body 10. By such means it may be provided that in the specified temperature range of about 300° to 500° F., the outer or surface layer, as indicated, which could in some instances be a layer of only 1 to 5 mil in thickness, will become fluidly adhesive while the interior of the body 10 will remain in an essentially stable form though capable of accommodating the load contour. The essence of the invention requirements are thus spelled out.

Turning now to the physical configuration of the invention example illustrated, the body 10 is shown to have a strip form and a cross section which has a frusto-pyramidal shape. Its cross section provides it with a broad base 15 from which opposing sides 14 incline upwardly to a relatively narrow apex surface 16. Embedded interiorly of the strip formed body 10, the length thereof, in this instance, is an electrical resistance wire 17. The latter may be integrated in the simple process of producing the body 10 per se. As seen, the wire 17 constitutes a core which is centrally positioned to be substantially equidistant between the base 15 and apex surface 16 and relatively equidistant from the sides 14. Whatever the length of the strip 10, its core 17 is either projected from or suitably exposed adjacent to its respective ends.

In the application of the invention illustrated, a strip 10 is used to fix a windshield 22 to the body 12 of an automobile 11. As seen in FIG. 1, at the front of the body 12 is an opening 13 adapted to accommodate the windshield. The strip used is either cut to length or preformed to seat coextensively with the automobile portion which rims the opening 13.

As seen in FIG. 2, the roof line of the body 12 terminates adjacent the upper run of the opening 13 in an angle bracket 18, the base of which provides a seat for the base 15 of the strip 10 along the upper edge of the opening. Along the bottom and side portions of the opening an extension 19 of the cowl 20 similarly seats the base 15 of the strip 10. A projected abutment portion of the cowl 20 provides a block 21 for seating the base of the windshield in outwardly spaced relation from the cowl portion forming the base run of the opening 13.

The strip 10 is so applied to seat about the opening 13 as described so its respective end portions are positioned in relatively adjacent relation centrally of the bottom edge of the opening. The core ends 17a and 17b are then exposed in side by side relation adjacent the ends of the strip.

Thus, in installing a windshield in accordance with the instant invention, a strip 10 is placed on the body 12 in a surmounting relation to the rim of opening 13 with the terminals of the core freely projecting as shown. The glass windshield 22 is then aligned with the opening and peripheral portions of its innermost surface are placed in contact with the apex portions of the strip 10 in a position of rest. The block means 21 forms a base to hold the glass so positioned. The parts at this time appear as shown in FIG. 3 of the drawings. At this point a source of electrical power is connected to the terminals 17a and 17b of the strip core. This causes the core to heat, the heat being elevated, of course, to the aforementioned temperature in the range of about 300° to 500° F., which heat uniformly flows from the interior to the exterior surfaces of the strip 10. By this means, the strip temperature is substantially equal at all its surfaces.

As a result of the heat so applied to a temperature within the range of from about 300° to 500° F. as before specified, the outer portions and only the outer portions of the strip 10 per se, which strip is preferably of the aforementioned modified butyl or ethylene-propylene rubber and characterized as previously described, become fluidly adhesive and the strip body plastically deforms under the pressure of the weight of the windshield per se. Due to the original shape of the strip 10, the body thereof deforms laterally so it tends to assume a configuration as shown in FIG. 4 of the drawings, the apex portion 16 achieving a broadened area of contact with the windshield 22.

As is obvious, a minimal effort is required to properly seat the windshield to the structure rimming the opening 13. The inherent definitive adhesive fluidity of the outer surfaces of the bonding strip 10, which is substantially uniform due to the interior source of the applied heat as here provided, and the load accommodating adjustment of the interior of the strip minimizes the pressure required to deform this strip and thereby seat the applied windshield in its proper position. This avoids any incidence of applied stress or strain which would produce cracking.

As a final step in this procedure, the flow of electrical current to the core 17 is discontinued and then the bonding strip is allowed to cool. On cooling of the strip body 10, the surface thereof inherently adheres and bonds tightly both to the glass windshield 22 and body structure 12 and in such a manner as to provide a seal. There is no effort of note involved and no messy materials employed.

Particular note should be taken that the use of the simple invention embodiment and process inherently eliminates any moisture that might be present on the surface of the elements which it bonds.

Thus, in using a coupling device in accordance with the instant invention it is positioned between elements to be bonded and heat is uniformly distributed preferably from an interior core. The heat is, as expressed, of a value sufficient to raise the temperature of the device to a range from about 300° to 500° F., the precise temperature depending on the material and the application, to a degree properly to soften the adhesive compound being used for the body of the device, leaving, however, the inner or core portion stable while achieving a differentiated fluidly adhesive outer surface. After proper temperature cycling, the heat source is removed and parts allowed to cool so a bond is completed and formed between the contacting parts.

Therefore, the invention basically provides in the example illustrated a coupling device which may take various forms depending on the application but consists of a body of material having an interior means capable of being energized to uniformly distribute heat through such material, which material is caused by such heat to have the surface thereof converted to a condition different than that of its inner portion to form a bond to an adjacent contacting part.

In the illustrated example, which is not limiting, the heat producing element is an electrically conductive element. Such element may be a simple wire as shown or a wound wire or impregnated core. It may even be a device lending reinforcing characteristics or even a foil tape. In the preferred embodiments the core is a wave formed wire, as will be further described. In any event, the heating element is embedded within the body of the bonding member and has portions thereof projected or accessible for connection to a heat source. It will be obvious that the body of the bonding element may take the form of a tape, sheet, cord, film or any mass contour, depending on the desired characteristics of the bond to be effected and the particular application.

The invention devices provide advantages of speed, cleanliness, and versatility in use and the ability to bond structures where mating contours are irregular. The bond is not produced by liquidizing a body but only its outer portion which includes its surface. The bond is therefore more stable and leak proof. Complex shapes may be readily bonded since the material of the bonding element such as the strip 10 may be such to readily adapt itself to irregularities and varying shapes in a plastic deforming process which still does not affect its basic strength. Also, due to the interior source of heat, a bond is produced with minimum heat distortion of the coupled elements. Note the electric resistance element or core is retained as an integral part of the bonding means. So may other cores be utilized. As is obvious, the core may in some instances serve as a reinforcement, preventing distortion of the coupling device during installation. The core may also serve a further purpose in releasing the bond produced between parts, since it facilitates the mechanical stripping of the bonding means, particularly on the energizing of the core as described. A point of merit also lies in the fact the application of heat to the bonding member as described reduces surface tension of adhesive compounds of which it is formed, in most cases, to increase wetting ability of the compound. The need for primers is in most cases eliminated thereby. Moreover, temperature differences in the bonding element are eliminated since the core utilized is generally centrally positioned. Proper control of heat dissipation to the several bonding element surfaces is thereby achieved and compensation for ambient temperatures is possible by controlling the heat value.

While a specific application of the invention relating to installation of glass elements in automobiles is shown, the invention is, of course, in no sense limited to this application. Rather does the invention have wide and general application to the bonding together of parts. Also, as previously noted, the coupling device may assume forms other than that shown in FIGS. 1 through 5 of the drawings. It may, for example, assume a tape or sheet-like form as shown in FIG. 6. There, a device 23 is formed by embedding, intermediate layers 24 and 25 of a heat sensitive film material having interior and exterior surface body characteristics of the nature of the coupling member previously described, to form a permanent part thereof, a conductive foil material 26. The functions and manner of use of the device 23 are the same as those of the strip 10. Parts to be joined together are respectively brought into respective contacting relation with the upper and lower layers 24 and 25 of the device, following which an electrical current is then passed through the core 26 with a consequent softening of the film portions 24 and 25. The surfaces of the layers 24 and 25, which are generally superposed, become fluidly adhesive, and, upon removal of the applied heat and subsequent cooling of the device and the parts between which it is interposed, such parts are joined together in a manner and by means forming a bond and constituting a seal.

As previously noted the preferred basic compound materials for fabricating embodiments of the invention have been found to be the aforementioned modified butyl and ethylene-propylene synthetic rubbers. When formed in the strip configuration they have been found readily adaptable to meet the terms of the present invention. The advantages are considerably amplified, as previously mentioned, by use of a wave formed wire core. The wave formed wire core appears to have particular significance in that it gives maximum flexibility to a strip section in all planes. Moreover, the configuration of the wave form core enables its optimum placement in relation to the surfaces of a strip element in accordance with the invention. The wave form enables a more complete and quicker distribution of the necessary heat to fluidize the surface of the strip. This of course will speed up the use of the strip in applications such as applying a windshield to an automotive vehicle. A further advantage of the wave form is that it avoids tendency of core wires such as used in prior art devices to melt out at sharp corners. In summary, the wave form increases heat radiation area, improves the characteristic of heat distribution and permits a greater range of section size and shape in reference to the strips employed.

Attention is directed to FIGS. 7 through 11 of the drawings for variations in the wave form as contemplated by the present invention. Take particular note in FIG. 7, we here have a sine wave, the waves lying in a common plane. In FIG. 8, the wave form is rectangular, whereas in FIG. 9 it has a saw-tooth configuration. In each of the latter cases, the waves are again in a common plane. Each of these forms has excellent characteristics and results and may be variously used depending on the application. In any instance, they have definite advantages over the concept of a straight wire core which have been above enumerated. It should be patently clear that the efficiency of the heat radiation and distribution utilizing the wave formed wire is significantly greater than the straight wire. Of course, the wave formed wire will be disposed in the core in a manner to most efficiently and quickly produce the fluidizing of the surface of the strip element so a windshield, for example, may be set and fixed in place in a minimum of time and with minimum effort.

Take particular note of FIGS. 10 and 11 of the drawings. In the case of FIG. 10 we have a sine wave form of wire with successive wave portions being respectively offset (See FIG. 10A) into different planes. FIG. 11 shows the same concept as applied to the rectangular wave form wire. FIGS. 10A and 11A show the optimal orientation of the devices of FIGS. 10 and 11 in a thermo-plastic strip per the invention. In any event, the effectiveness and ability of invention embodiments to achieve the desired result is clearly advanced and enabled by the various formed wire elements to be used as core elements as here proposed.

There are also inherent unobvious advantages in using the wave formed wire in accordance with the invention. A strip can, for example, include a wave formed wire and be cut to length with no allowance for terminal end exposure of the wire. This is due to the fact that a wave formed wire core can be pulled out by stretching to produce the necessary terminal ends. Thus, a strip in accordance with the invention may introduce an extra cost saving factor where wave formed wires are employed as the core.

It is another unobvious advantage in application of the invention embodiments that in the case where the electrical resistance wire is employed, the same may be utilized to function as an antenna for a radio, for example. This is possible since the body of the invention strip inherently serves to insulate the wire from the surrounding structure.

In summary it will be seen from the foregoing that the use of the invention avoids the necessity of handling messy substantially liquid adhesive or sealing compounds and enables a self-locking of parts without the need for any degree of externally applied forces. As particularly applied to the setting of windshields as here illustrated, it will be clear that there will be substantial savings in labor and attendant costs as contrasted to the use of materials and practices as known in the prior art.

It will be self-evident from the foregoing that there is inherent in the invention as here disclosed a unique process of applying windshields, windows and the like to a frame of dissimilar material, in particular metal. Moreover, there is produced, by the application of the invention, considerably improved window and windshield units the composition of which affords a structure which has been improved to an unexpected degree.

As an appendix to the foregoing the following enumerated examples of embodiments of the invention are provided to illustrate the various manner in which one versed in the art may easily arrive at embodiments of the invention given the conditions, properties and requirements set forth above:

EXAMPLE A

| STRIP COMPOUND - WITH TACKIFIER/OIL MIGRATION | |
| --- | --- |
| INGREDIENT | PARTS BY WEIGHT* |
| BUTYL RUBBER | 25 |
| CROSS LINKED BUTYL RUBBER | 50 |
| ETHYLENE-PROPYLENE RUBBER | 25 |
| REINFORCING CARBON BLACK | 100 |
| KAOLIN CLAY | 60 |
| AMORPHOUS POLYPROPYLENE | 10 |
| HIGH MOLECULAR WT. POLYBUTENE | 70 |
| POLYISOBUTYLENE | 10 |
| HYDROCARBON TACKIFIER RESIN | 25 |
| PARAFFINIC OIL | 5 |

*INGREDIENT RATIOS WILL VARY SOMEWHAT DEPENDENT ON THE PARTICULAR SUPPLIERS OF THE INGREDIENTS.

EXAMPLE B

STRIP COMPOUND - WITH TACKIFIER/SOLVENT MIGRATION

| INGREDIENT | PARTS BY WEIGHT* |
|---|---|
| BUTYL RUBBER | 50 |
| CROSS LINKED BUTYL RUBBER | 50 |
| REINFORCING CARBON BLACK | 130 |
| ASBESTOS SHORTS | 30 |
| AMORPHOUS POLYPROPYLENE | 10 |
| HIGH MOLECULAR WT. POLYBUTENE | 70 |
| POLYISOBUTYLENE | 10 |
| HYDROCARBON TACKIFIER RESIN | 28 |
| MINERAL SPIRITS | 2 |

*INGREDIENT RATIOS WILL VARY SOMEWHAT DEPENDENT ON THE PARTICULAR SUPPLIERS OF THE INGREDIENTS.

EXAMPLE C

STRIP COMPOUND - COATED-CORE TYPE

| INGREDIENT | PARTS BY WEIGHT* |
|---|---|
| CORE COMPOUND | |
| ETHYLENE PROPYLENE RUBBER | 50 |
| CROSS LINKED BUTYL RUBBER | 50 |
| REINFORCING CARBON BLACK | 150 |
| HIGH MOLECULAR WT. POLYBUTENE | 80 |
| PARAFFINIC OIL | 5 |
| COATING COMPOUND | |
| ETHYLENE PROPYLENE RUBBER | 100 |
| REINFORCING CARBON BLACK | 125 |
| HIGH MOLECULAR WT. POLYBUTENE | 80 |
| POLYISOBUTYLENE | 20 |
| AMORPHOUS POLYPROPYLENE | 10 |
| HYDROCARBON TACKIFIER RESIN | 30 |

*INGREDIENT RATIOS WILL VARY SOMEWHAT DEPENDENT ON THE PARTICULAR SUPPLIERS OF THE INGREDIENTS.

EXAMPLE D

STRIP COMPOUND - COATED-CORE TYPE

| INGREDIENTS | PARTS BY WEIGHT* |
|---|---|
| CORE COMPOUND | |
| CROSS LINKED BUTYL RUBBER | 100 |
| REINFORCING CARBON BLACK | 75 |
| FINE HYDRATED SILICA | 75 |
| HIGH MOLECULAR WT. POLYBUTENE | 80 |
| PARAFFINIC OIL | 5 |
| COATING COMPOUND | |
| ETHYLENE PROPYLENE RUBBER | 75 |
| BUTYL RUBBER | 25 |
| REINFORCING CARBON BLACK | 125 |
| HIGH MOLECULAR WT. POLYBUTENE | 80 |
| THERMOPLASTIC PHENOLIC RESIN | 20 |
| POLYISOBUTYLENE | 20 |

*INGREDIENT RATIOS WILL VARY SOMEWHAT DEPENDENT ON THE PARTICULAR SUPPLIERS OF THE INGREDIENTS.

EXAMPLE E

STRIP COMPOUND - COATED-CORE TYPE

| INGREDIENTS | PARTS BY WEIGHT* |
|---|---|
| CORE COMPOUND | |
| POLYAMIDE RESIN | 100 |
| THERMOPLASTIC PHENOLIC RESIN | 25 |
| CHLORINATED WAX | 10 |
| COATING COMPOUND | |
| POLYAMIDE RESIN | 100 |
| THERMOPLASTIC PHENOLIC RESIN | 30 |

*INGREDIENT RATIOS WILL VARY SOMEWHAT DEPENDENT ON THE PARTICULAR SUPPLIERS OF THE INGREDIENTS.

EXAMPLE F

STRIP COMPOUND - COATED-CORE TYPE

| INGREDIENTS | PARTS BY WEIGHT* |
|---|---|
| CORE COMPOUND | |
| POLYAMIDE-RESIN/340°-360° F. SOFTENING POINT | 100 |
| COATING COMPOUND | |
| POLYAMIDE-RESIN/220°-240° C. SOFTENING POINT | 100 |

*INGREDIENT RATIOS WILL VARY SOMEWHAT DEPENDENT ON THE PARTICULAR SUPPLIERS OF THE INGREDIENTS.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Note should be taken of the fact that by definition a material which is polymerizable is not a thermo-plastic and therefore excluded from the range of materials constituting the substance of the coupling device of the present invention as defined herein and in the following claims.

The embodiments of the invention in which an exclusive property or privilege is claimed are defined as follows:

1. A coupling device, having special application to creating a bond between metal and glass, including an element physically comprised of stable flexible thermoplastic material, said element being constituted of materials which in a temperature range including from about 300° to about 500° F. are constructed and arranged to provide said element with an internal or core portion of thermo-plastic material which has a stable load accommodating form and an external portion defining its outermost surface having a fluidly adhesive form.

2. A coupling device according to claim 1 wherein said element has an elongate strip-like configuration and said external portion of said element is provided with the property and means to provide a contact bond thereof to adjacent parts of like and unlike materials when its temperature level is in the range of 300° to 500° F.

3. A coupling device as in claim 2 having means for applying heat in the range of 300° to 500° F. to and distributing said heat through said element, said heat applying means including an electrical resistance wire unit installed in connection with said element.

4. A coupling device as in claim 3 wherein said electrical resistance wire unit is positioned interiorly of said element, runs the length thereof, has a wave-like form and occupies a plurality of planes which are angularly related.

5. A coupling device as in claim 1 wherein the materials which constitute said device are chemically and physically reversible and a bond effected by said device is adapted for release by application of heat to said element in the range of 300° to 500° F.

6. A coupling device as in claim 1 wherein said element is basically comprised of modified butyl or ethylene propylene synthetic rubber and embodies within the composition thereof means for producing a fluidly adhesive surface on said element which affords a contact bond to an adjacent part when said element has a temperature in said range from about 300° to 500° F.

7. A coupling device as in claim 1 wherein said element has an elongate strip form and is flexible and compressible to provide for its contoured placement on an irregular base surface for connecting to said base surface a segment of glass or other part of different material and is constructed and arranged to essentially maintain its stable, flexible original form until it reaches a temperature in the range of 300° to 500° F. at which time said external portion of said strip provides means adapted to superficially flow into and fill the contact areas between said segment and said base surface on being positioned therebetween and to produce a coupling thereof by mere contact.

8. A coupling device as in claim 6 wherein opposed portions of the external surface of said strip are configured to have differentially dimensioned contact with parts to which they are intended to bond which dimension of contact equalizes under the influence of compression between the parts said strip is intended to bond.

9. A coupling device, comprising a relatively solid body member of thermo-plastic material having an elongated strip-like form, said member being flexible to provide for a contoured installation thereof on one part to form a bond and a seal between said one part and another superposing part seating on the said body member, said body member being structured and of a composition such that under the influence of a temperature in the range of 300° to 500° F. it includes a relatively stable internal or core portion adapting, but only to the degree necessary, to the contour of an applied load and an external outer surface portion which has a fluidly adhesive form, said body member having an initial cross-sectional outline of one configuration a portion of which is oriented in use to seat to said one part while the other part abuts an opposite portion, and means within said body member for disseminating heat through the interior thereof and to its outer surface to a level in a range from about 300° to 500° F. under the influence of which only the external portions of said body member achieve a fluid state and said fluid outer surface portions have an adhesive form which serves to provide for a bond of said body member to and between said parts in contact therewith, said body member being adapted under the influence of an applied load to assume a different cross-sectional outline providing opposing faces thereon which achieve a wide sealing and adhering contact with said parts while said body member retains the cross-sectional configuration of a solid by reason of its stable core and said heat disseminating means provides means for re-heating said body member after the cooling and bonding thereof, said body member being constructed and arranged when subjected to re-heating at a level of 300° to 500° F. to reassume a fluidly adhesive form at its outer surface portions only, whereby to facilitate the stripping of said body member from and between said parts.

10. A coupling device according to claim 9 wherein said body member is multi-sided and said heat disseminating means is provided within said body member in a position to distribute heat substantially uniformly to each of the outer side surface portions of said body member.

11. A coupling device according to claim 9 wherein said body member is basically a modified butyl or ethylene-propylene synthetic rubber in a mix including selected percentages of fillers, tackifiers and plasticizers providing a compound which under the influence of applied heat in a temperature range of about 300° to 500° F. is constructed and arranged to produce a controlled migration of the tackifiers and plasticizers to provide said fluidly adhesive form of the outer surface of said member while leaving underlying portions of the body member stable though deformable under compression.

12. A coupling device for joining together superposing parts made of dissimilar materials, including a body member having a flexible solid strip-like form and a substantial mass in cross section, said body member being made basically of a thermo-plastic material which differs from the material of which said parts are made and being constructed and arranged to originally have a stable load accommodating form and to have, under the influence of a temperature in a range from about 300° to 500° F., a change in form providing it with a relatively stable interior structure which is plastically deformable and an external surface structure which has a fluid adhesive form, said body member being adapted when interposed between parts of dissimilar materials to form a seal and a bond therebetween under the influence of said temperature within said range of about 300° to 500° F. while retaining a substantial cross sectional mass.

13. A device as in claim 12 wherein said body member has an electrical resistance core to raise the temperature of said body member to said temperature range, and said body member in said temperature range is distinguished by having only portions thereof forming its outer surface liquidized and rendered fluidly adhesive, and said core is connected to retain an integrated relation with said body member throughout a heating and cooling cycle thereof.

14. A coupling device according to claim 13 wherein said body member is made of a thermo-plastic material structured for reversibility, and is constructed and arranged once it is applied as a bonding member, to be stripped from the parts to which it is joined by being subjected to a temperature in said range of about 300° to 500° F.

15. A coupling device particularly applicable to the bonding of metals and glass materials comprising a body structure of thermo-plastic material having interior and surface portions thereof differentially structured in the temperature range of about 300° to 500° F., said surface portions in said temperature range being fluidly adhesive and adapted to produce a contact bond between parts of said unlike metal and glass materials and said interior body portions having a relatively stable load accommodating form under the influence of said elevated temperature and below said temperature range said body being structured to have a stable, flexible form throughout.

16. A coupling device as in claim 15 including means in said body energizable to raise the temperature of said body to within said temperature range to selectively bond or achieve a release thereof from said parts.

17. A coupling device as in claim 15 wherein said body structure has differently comprised inner body portions and outer surface portions to produce a layered construction thereof.

18. A coupling device as in claim 15 wherein said element is applied to provide a bond and seal between a part defining an opening and a closure part for said opening, said element having an elongated strip form arranged to marginally surround the opening to be closed, said element having a substantial mass in cross section and being supported on the first said part defining an opening to provide a seat for said closure part and means embedded in said element and projecting from opposite ends thereof for connection to a source of heat, said element presenting opposite surface portions, respectively to contact the first said part and to seat said closure part and under the influence of an application of heat in a temperature range between 300° to 500° F. said internal or core portion of said element being adapted to retain an essentially stable load accommodating form as the external portion thereof achieves a fluidly adhesive form to create a bond and seal between said parts on contact therewith.

* * * * *

UNITED STATES PATENT AND TRADEMARK OFFICE
CERTIFICATE OF CORRECTION

PATENT NO. : 4,184,000

DATED : January 15, 1980

INVENTOR(S) : Stephen A. Denman

It is certified that error appears in the above-identified patent and that said Letters Patent are hereby corrected as shown below:

Col. 4, l. 45, "advantages" is corrected to read -- advantageous --.

Col. 12, l. 21, "C." is corrected to read -- F. --.

Signed and Sealed this

Seventeenth Day of June 1980

[SEAL]

*Attest:*

SIDNEY A. DIAMOND

*Attesting Officer*  *Commissioner of Patents and Trademarks*